United States Patent [19]
Osterman

[11] Patent Number: 5,410,720
[45] Date of Patent: Apr. 25, 1995

[54] APPARATUS AND METHODS FOR GENERATING AN AC POWER SIGNAL FOR CABLE TV DISTRIBUTION SYSTEMS

[75] Inventor: Thomas S. Osterman, Bainbridge Island, Wash.

[73] Assignee: Alpha Technologies, Bellingham, Wash.

[21] Appl. No.: 967,773

[22] Filed: Oct. 28, 1992

[51] Int. Cl.$^6$ ............................................... H04H 1/14
[52] U.S. Cl. ..................... 455/3.3; 455/298; 455/343; 340/310.02
[58] Field of Search .................. 455/3.3, 3.1, 298, 299, 455/6.1, 6.3, 16, 343, 127; 358/86; 340/310 R, 310 A; 348/6, 7, 12, 17; 375/36; 307/263, 268, 228; 330/200

[56] References Cited

U.S. PATENT DOCUMENTS

| | | | |
|---|---|---|---|
| 2,240,123 | 4/1941 | Shoup et al. | 455/298 |
| 3,064,195 | 11/1962 | Freen | 455/3.3 |
| 3,525,035 | 8/1970 | Kakalec . | |
| 3,525,078 | 8/1970 | Baggott | 340/310 R |
| 3,943,447 | 3/1976 | Shomo, III | 455/3.3 |

FOREIGN PATENT DOCUMENTS 2005118 4/1979 United Kingdom ............ 340/310 R Primary Examiner—Edward F. Urban
Assistant Examiner—Nguyen Vo
Attorney, Agent, or Firm—Hughes, Multer & Schacht

[57] ABSTRACT

A cable TV distribution system in which an AC power signal is generated according to the following steps: (a) generating an AC power signal having at least a positive half-cycle, where the positive half-cycle comprises a rising portion, a falling portion, and a central portion; and (b) limiting the slew rate of the AC power signal within the rising portion to a range of 30 V/ms and 50 V/ms inclusive. Preferably, the slew rate of the AC power signal within the falling portion is limited to the range of −30 V/ms and −50 V/ms inclusive. The AC power signal is preferably generated by a power supply comprising: (a) circuit that generates a first drive signal having a first portion comprising a series of pulses, a second portion comprising a series of pulses, and a third portion comprising a single pulse; (b) a drive circuit that generates a pulsed power signal the timing of which corresponds to the timing of the first drive signal; (c) a transformer; and (d) an output capacitor for integrating the output of the drive circuit.

16 Claims, 8 Drawing Sheets

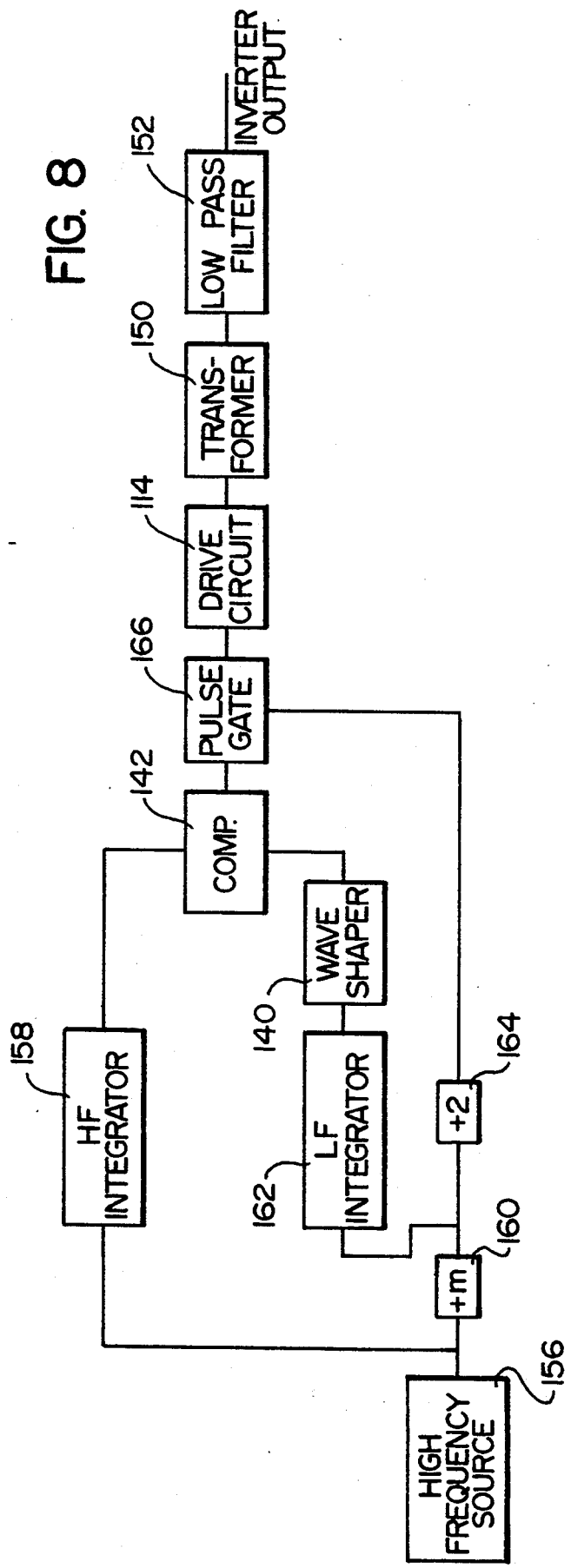

APPARATUS AND METHODS FOR GENERATING AN AC POWER SIGNAL FOR CABLE TV DISTRIBUTION SYSTEMS

TECHNICAL FIELD

The present invention relates to cable systems for distributing television (TV) signals, and, more particularly, to apparatus and methods for so generating power signals used in such cables systems that interference with the TV signal distributed thereby is reduced.

BACKGROUND OF THE INVENTION

In a cable TV system, a distribution system is used to carry a cable TV signal from an origination point, referred to as a "headend", to a television at the subscriber's premises. An exemplary cable TV distribution system is depicted at 10 in FIG. 1. A headend of the cable system 10 is indicated at 12 and typical subscribers' premises are indicated at 14. The headend 12 combines separate information carrying signals into an RF cable TV signal. A television set (not shown) at the subscribers' premises 14 selects one of the information carrying signals from the cable TV signal, decodes this signal, and displays the decoded information to a subscriber.

As shown in FIG. 1, the information carrying signals that are combined to form the cable TV signal may be supplied to the headend 12 by such sources as a satellite receiver 16, a point-to-point microwave receiver 18, a video tape player 20, or a studio 22.

A system for distributing the cable TV signal from the headend 12 to the subscribers' premises 14 is indicated at 24 in the drawing. This cable system 24 basically comprises a trunking system 26 and a distribution system 28.

The trunking system 26 is designed to conduct the cable TV signal from the headend 12 to the distribution portion 28. Three common methods of implementing such a trunking portion 26 are a coaxial cable trunking system, a point-to-point microwave trunking system, or a fiber optic cable trunking system. The details of the these trunking systems are not per se part of the invention and will not be discussed in further detail below.

The cable TV signal is carried over coaxial cables once it arrives at the distribution system 28. The distribution system 28 generally comprises: (a) a series of main coaxial cables 30; (b) one or more amplifiers 32 referred to as line extenders located in the series of main coaxial cables 30; (c) one or more power supplies 34; (d) a power inserter 36 for each of the power supplies 34; (e) one or more taps 38; and (f) low capacity coaxial drop cable 40 extending between each tap 38 and the subscribers' premises 14 associated therewith.

The line extenders 32 are employed to maintain signal strength as the cable TV signal is distributed over the main coaxial cables 30. These line extenders 32 obtain power from an AC power signal generated by the power supplies 34 and introduced into the main coaxial cables 30 through the power inserters 36. The main coaxial cables 30 branch off to feed the taps 38.

The problem addressed by the present invention is caused by an interaction between the AC power signal generated by the power supplies 34 and the components within the taps 38. Accordingly, to understand the nature of this interference problem, the details of construction and operation of currently available power supplies 34 and taps 38 will now be described in further detail.

The power supplies 34 are designed to operate in two modes of operation: (a) a line mode in which power is supplied through utility power lines; and (b) a standby mode in which power is supplied by a battery or series of batteries. A simplified block diagram of an exemplary power supply 34 is depicted in FIG. 2. Power supplies such as that shown in FIG. 2 are well-known and currently available on the market from several different sources.

The power supply 34 basically comprises an AC module 42, an inverter module 44, a battery 45, a connection 46 to line voltage, a line sensing circuit 48, and a transfer relay 50. The power supply 34 operates in the following manner. During normal operation, the AC module 42 generates a line AC power signal from the line voltage; in such normal operation, the transfer relay 50 is arranged to allow this line AC power signal to pass to an output terminal 51. When the line sensing circuit 48 determines that a fault exists in the line voltage, the line sensing circuit 48 sends a signal to the inverter module 44 to begin generating a standby AC power signal. The sensing circuit 48 also sends a signal to the transfer relay 50 to connect the inverter module 44, rather than the AC module 44, to the output terminal 51.

The operation and construction of the AC module 42, which basically comprises a ferroresonant transformer and an output capacitor, is well-known, is not directly relevant to the present invention, and thus will not be discussed in further detail.

A typical inverter circuit comprising the elements of the inverter module 44 and the battery 45 of the known power supply 34 is shown at 52 in FIG. 3. Basically, this inverter circuit 52 comprises a frequency source 54, an inverting element 56, first and second drive circuits 58 an 60, first and second switching transistors 62 and 64, a latching element 66, and a linear transformer 68. The transformer 68 has first and second windings 70 and 72. A positive terminal 74 of the battery 45 is connected to a center tap 76 of the first winding 70; a negative terminal 78 of the battery 45 is connected to ground.

The first and second switching transistors 62 and 64 are connected at their bases to the first and second drive circuits 58 and 60, respectively. The emitters of these transistors 62 and 64 are connected to ground, while the collectors thereof are connected to opposite ends of the first winding 70.

The ends of the second winding 72 are connected to output terminals 78 and 80.

This inverter circuit 52 operates in the following basic manner. The frequency source generates a 60 Hz square wave. This square wave is applied to the first drive circuit 58 and the inverting element 56. The inverting element 56 generates an inverted square wave that is applied to the second drive circuit 60. The latch element 66, in response to a signal generated by the line sensing circuit 48, allows the square wave and its inverted counterpart to reach the first and second drive circuits 58 and 60 when the line sensing circuit 48 senses a fault in the output of the AC module 42.

In response to the square waves, the first and second drive circuits provide an appropriate voltage to the bases of the switching transistors 62 and 64 to turn these transistors on when the square waves are high. Further, because the square wave inputs to the first and second drive circuits are inverted from each other, the switching transistor 62 is "ON" when the switching transistor 64 is "OFF", and vice versa.

When either of the transistors 62 and 64 is "ON", current flows from positive terminal 74 of the battery 45, through the transformer center tap 76, out the appropriate end of the transformer first winding 70, through the "ON" transistor, and to ground (battery negative terminal 78).

The transformer 68 is a linear transformer. Therefore, for a battery 45 having a DC voltage $V_B$, the above-described system generates at the output terminals 80 and 82 the standby AC power signal. The standby AC power signal is a square wave signal having a peak voltage of approximately $V_B$.

This square wave standby AC power signal has heretofore been considered desirable for at least two reasons. First, the inverter module 44 operates most efficiently when generating such a square wave. Specifically, the switching transistors 62 and 64 operate most efficiently when they are either "ON" or "OFF". When they are "ON", they act like a short circuit, and thus very little energy is dissipated therein. When they are "OFF", they act like an open circuit, allowing substantially no current to pass therethrough and thus consuming very little or no power. The square wave AC power signal requires these transistors to be switched quickly between "ON" or the "OFF", thus spending most of the time in their most efficient states.

The second reason such a square wave AC power signal is considered desirable is because, as is well-known in the art, the line extenders 32 can efficiently convert such a square wave signal into a DC power signal.

Referring now to FIG. 4, shown therein is a schematic of a typical tap 38. A typical tap 64 basically comprises a power passing choke 84, a coupling transformer 86, and first and second RF coupling capacitors 88 and 90. The first capacitor 88 and coupling transformer 86 filter out the AC power signal generated upstream by the power supplies 34 and reduce the voltage of the RF cable TV signal to a level appropriate for the subscriber's television. The drop cables 40 extend from the output of the coupling transformer 86 to the subscriber's premise 14. The choke 84 and second RF coupling capacitor 90 allow the RF cable TV signal and the AC power signal to pass through the tap 38.

A primary function of the tap 38 is to allow the cable TV signal to be dropped to a number of subscriber's premises from a single point on the distribution cable 30. Other important functions of these taps 64 are to: (a) reduce the voltage level of the signals entering the subscribers' premises 14; and (b) isolate the low capacity coaxial drop cables 40 feeding the subscribers' residences 14 from the distribution coaxial cables 30.

The AC power signal generated by the inverter circuit 52 described above has been found to cause the taps 38 to generate an interference signal that interferes with the cable TV signal entering the subscriber's premises through the drop cable 40.

The interference signal has been attributed at least in part to the inverter circuit 52 because this interference has been found to be more likely to occur when the power supply is in standby mode; this interference problem is much less likely to occur when the AC power signal is being generated by the AC module 42 connected to the line voltage.

Also, it has been discovered that this interference problem is much mores severe: (a) for a given range of values chosen for the capacitors employed in the taps; and (b) when large numbers of taps are attached in series to a single power supply. Accordingly, the taps are also believed to be responsible for this interference problem.

An example of lines in the television picture caused by the above-described interference signal is depicted in FIG. 5.

Several steps may be taken to alleviate to some extent the interference problem solved by the present invention.

As one option, the capacitance values of the capacitors within the taps may be reduced. Previously, in an attempt to increase the bandwidth of the signal that may pass through the taps, at least one tap manufacturer has increased the values of the capacitors within the taps. The taps with such increased capacitor values are more susceptible to the interference problem described above. Accordingly, the problem may be alleviated to some extent by providing capacitors in the taps with smaller capacitance values.

However, it is generally desirable, in order to allow increased bandwidth of the signal that may be passed through the taps, not to rely on these smaller capacitance values to solve the interference problem addressed by the present invention. Further, given the number of taps currently installed, it is not economical change the taps or the capacitors within these taps at this time.

As a second option, the number of taps in the line downstream from each power supply may be reduced. Placing a large number of taps in series downstream of a given power supply increases the voltage spikes occurring towards the end of the line. This is because the signal is passed through the differentiating circuits formed in a number of successive taps, with the peak of the voltage spikes being increased by each tap. Theoretically, the present problem may thus be alleviated by decreasing the number of taps connected in the line downstream of each power supply by increasing the number of power supplies.

However, it is not practical in a cable TV system to decrease the number of taps in this manner because to do so would require the purchase and installation of a large number of relatively costly power supplies.

PRIOR ART

It has been proposed that the above described problem may be solved or reduced by replacing the linear transformer employed in the circuit 52 with a ferroresonant transformer. A ferroresonant transformer is not linear and thus does not pass the very square wave yielded by a linear transformer. However, this approach is expensive and requires substantial modification of the inverter module.

OBJECTS OF THE INVENTION

It should be clear from the foregoing that a major object of the present invention is to provide an AC power signal that does not cause interference with the cable TV signal in a cable TV distribution system.

Another important, but more specific, object of the present invention is to provide apparatus and methods for generating AC power signals that have desirable combination of the following characteristics:

a. requires only minor modification of the prior art inverter module to solve the tap saturation problem;

b. efficiently operates;
c. does not require modification of the taps;
d. inexpensive to implement; and
e. operates high power switching transistors primarily in their most efficient "OFF" or "ON" conditions.

SUMMARY OF THE INVENTION

The Applicant has recognized that the steeply rising AC power signal generated by prior art power supplies in standby or inverter mode causes the interference problem discussed above. Specifically, the RF coupling capacitor 88 and transformer winding 92 form an integrator circuit that generates a voltage spike for each leading and trailing edge of each half-cycle of the AC power signal. These brief voltage spikes saturate the taps and prevent passage of the cable TV signal twice during each cyle of the AC power signal.

The applicant thus recognized that these leading and trailing edges must be shaped in a manner that eliminates this saturation of the taps. Specifically, the present invention comprises at its most basic form generating an AC power signal having at least a positive half-cycle, where the positive half-cycle comprises a rising portion, a falling portion, and a central portion. The slew rate of the AC power signal within the rising portion should be limited in the environment of the cable TV distribution system to a range of 30 V/ms to 50 V/ms inclusive. Preferably, the slew rate of the AC power signal within the falling portion is limited to the range of −30 V/ms and −50 V/ms inclusive. This method results in a waveform that does not cause saturation of the taps under normal circumstances.

The desired AC power signal may alternatively be defined as an AC power signal having at least a positive half-cycle, where the positive half-cycle comprises a rising portion, a falling portion, and a central portion that is relatively flat in comparison to the rising portion. Within the rising portion, the AC power signal is so limited that the AC power signal remains within a range inclusively defined by (a) a first line segment extending between a first point at the beginning of the rising portion and a second point at the end of the rising portion, and (b) a first curve segment of a first sinusoidal curve having the same period as the AC power signal, the first curve segment extending between the first and second points.

The present invention may be embodied in a power supply for generating an AC power signal for supplying power to line extending amplifiers in a cable TV distribution system. Such a power supply comprises: (a) means for generating at least a first drive signal having a first portion comprising a series of pulses, a second portion comprising a series of pulses, and a third portion comprising a single pulse; (b) means for generating at least a first pulsed power signal the timing of which corresponds to timing of the first drive signal; (c) a transformer for altering the voltage of the first pulsed power signal; and (d) means for integrating the altered first pulsed power signal to obtain the AC power signal. Such a power supply allows operation of high power switching transformers in their most efficient "ON" or "OFF" states while still yielding an AC power signal that does not cause saturation of the taps; this power supply can also be easily constructed merely by modifying one portion of the prior art inverter module.

BRIEF DESCRIPTION OF THE DRAWINGS

FIG. 8 is a more detailed block diagram of the inverter module of the present invention;

DETAILED DESCRIPTION OF THE INVENTION

Figure 1:
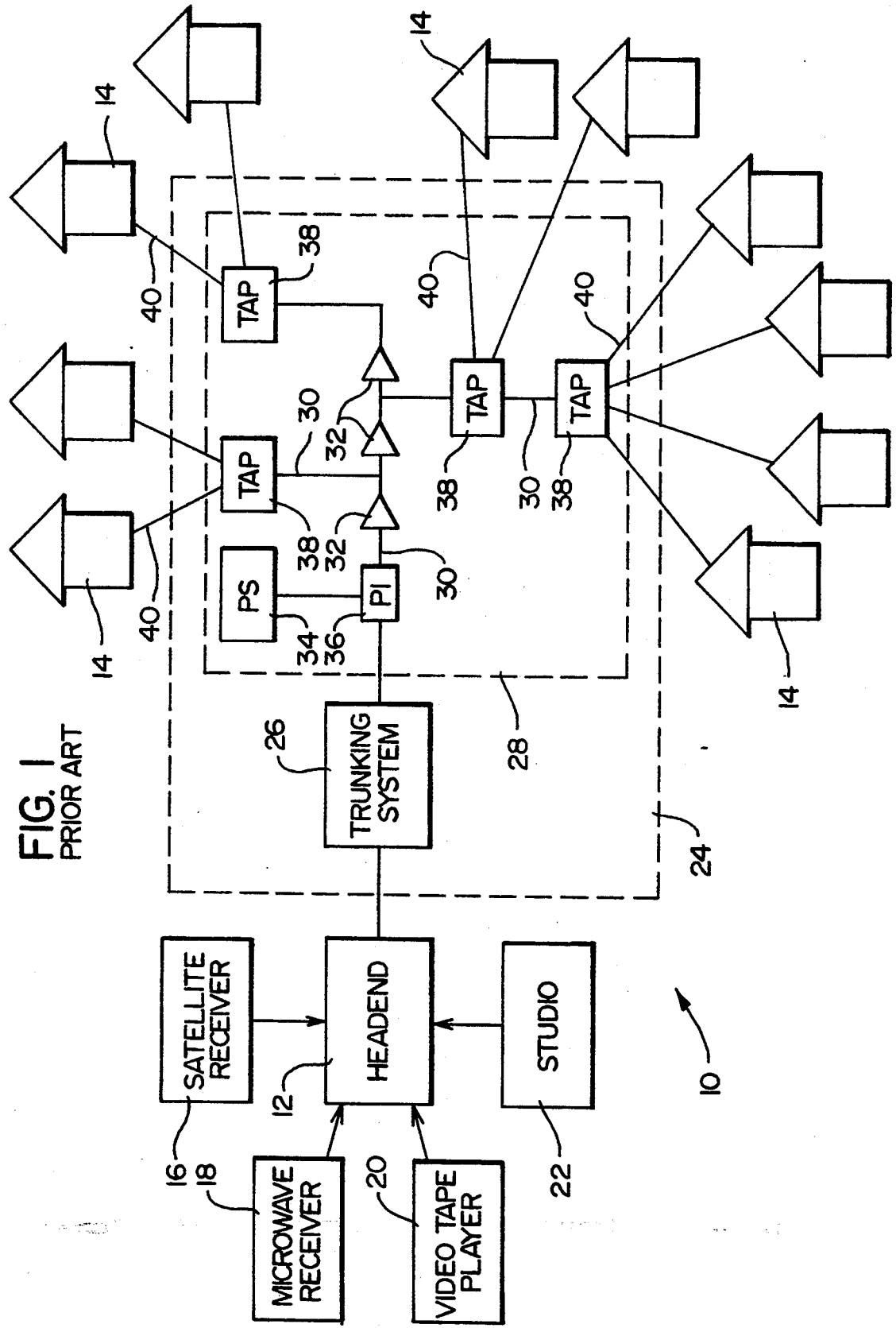
FIG. 1 is a simplified block diagram of a typical cable TV distribution system.
Figure 2:
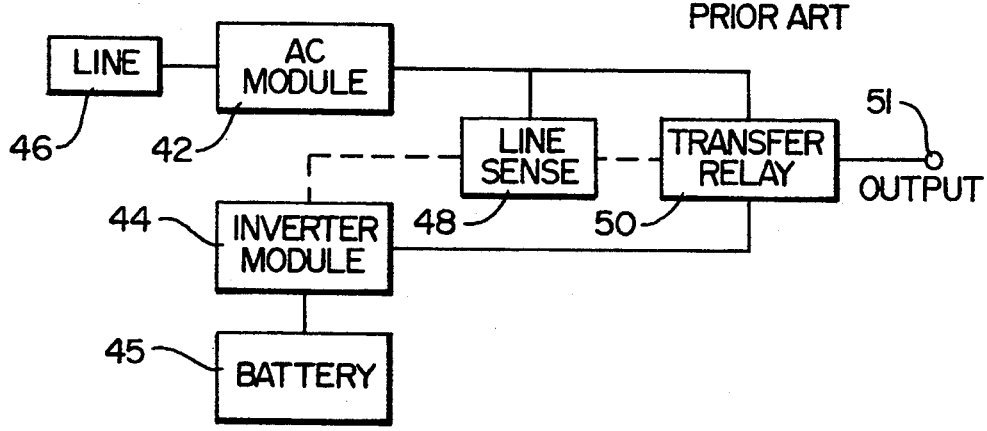
FIG. 2 schematically depicts a typical power supply as used in a cable TV distribution system.
Figure 3:
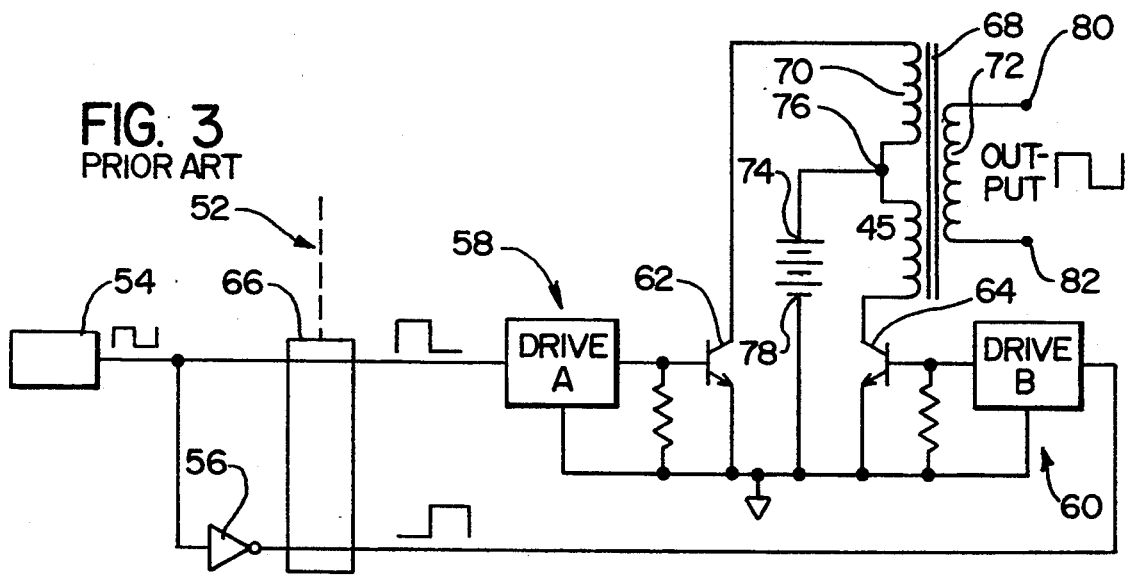
FIG. 3 is a schematic depiction of a prior art inverter module.
Figure 4:
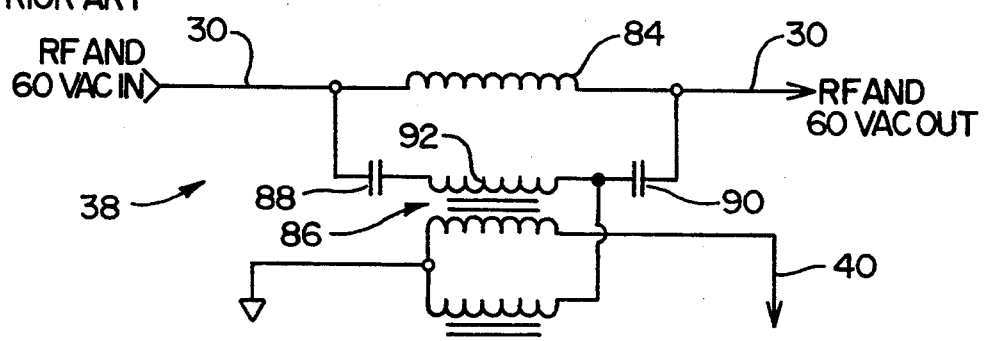
FIG. 4 is a simplified circuit diagram of a typical tap employed in the distribution system depicted in FIG. 1.
Figure 5:
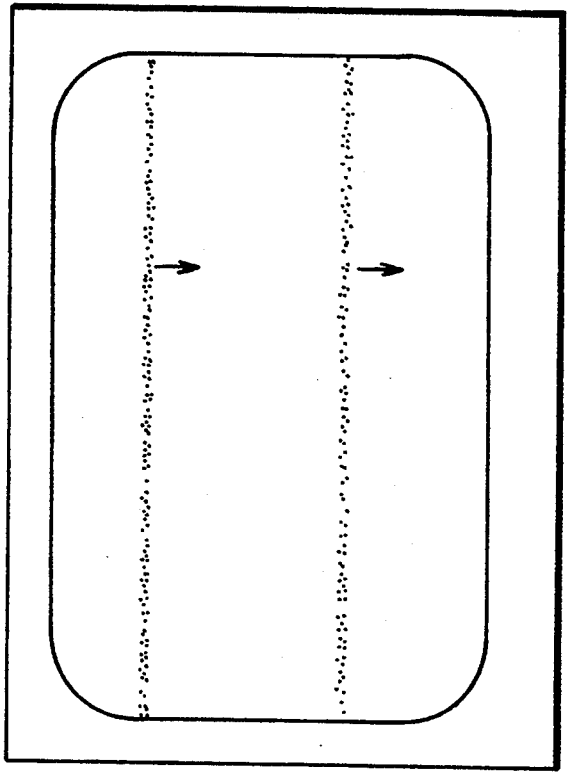
FIG. 5 is an illustration of the typical interference problem solved by the present invention.
Figure 6:
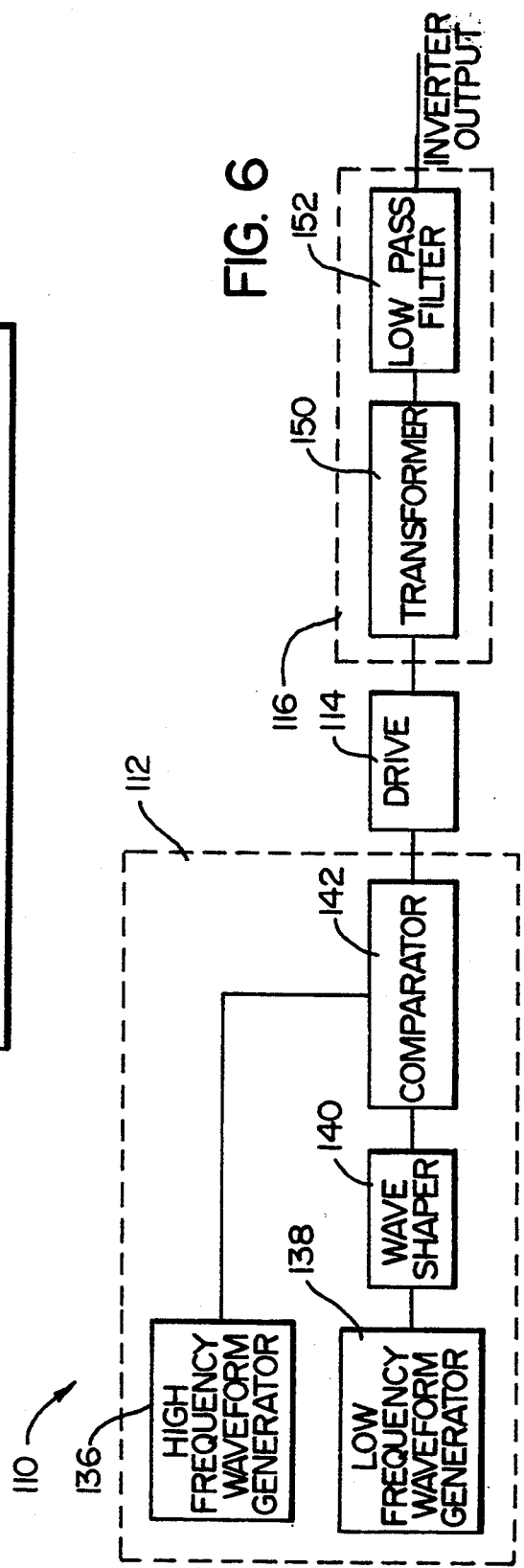
FIG. 6 is a simplified block diagram of an inverter module constructed in accordance with the present invention.

Depicted at 110 in FIG. 6 is an inverter circuit 110 constructed in accordance with, and embodying, the principles of the present invention. This circuit 110 may be substituted in the inverter module 44 for the inverter circuit 52 described above.

At its most basic, the inverter circuit 110 comprises control signal generating circuit 112, a drive circuit 114, and an output circuit 116. The inverter circuit 110 generates as its output an AC power signal such as that indicated at 118 in FIG. 7. The AC power signal is cyclical, has a period P, and comprises positive and negative half-cycles, which are indicated by reference characters 120 and 122, respectively. As shown, one positive and one negative half-cycle occur during each period P.

The negative half-cycle 122 is an inverted mirror image of the positive half-cycle 120. Accordingly, the following discussion will concentrate on the positive half-cycle depicted at 120 with the understanding that the parameters of this positive half-cycle 120 apply in an inverted, mirror image fashion to the negative half-cycle 122.

The positive half-cycle 120 of the exemplary AC power signal 118 comprises: (a) a gradually increasing rising portion 120a and a gradually decreasing falling portion 120b so shaped, as will be described in detail below, that they do not cause the voltage spikes described above in the Background of the Invention; and (b) a substantially flat peak portion 120c for efficient delivery of power to the line extenders 32 described above. The shape of the positive half-cycle 120 will be described in further detail below.

Figure 7:
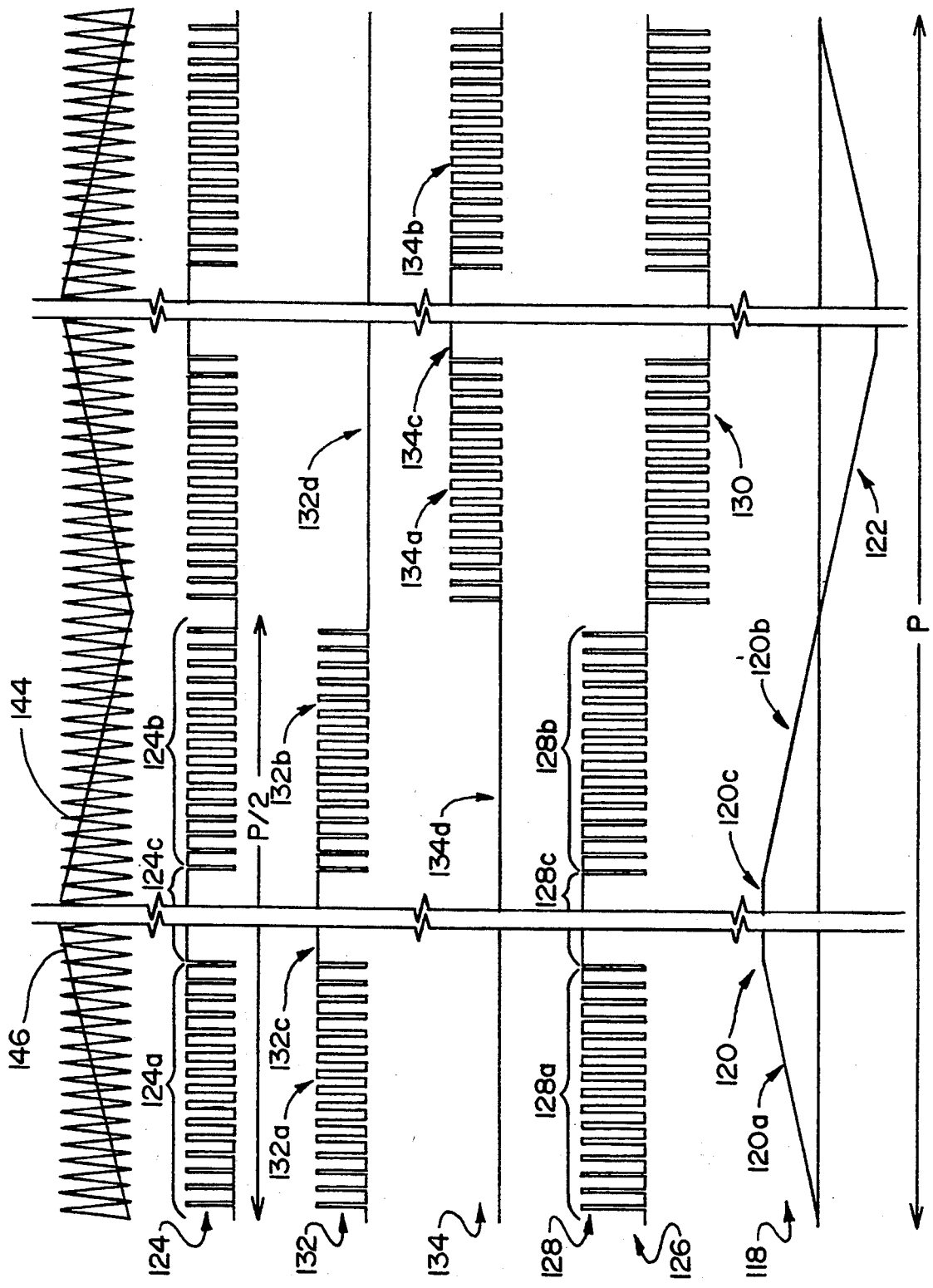
FIG. 7 is a timing diagram illustrating the timing relationships of the various signals within the inverter module of the present invention.

Referring again to the inverter circuit 110, the exemplary control signal generating circuit 112 thereof generates a control signal such as that depicted at 124 in FIG. 7. This control signal 124 is cyclical with a period of P/2. Each cycle of the control signal 124 comprises first and second portions 124a and 124b containing a series of pulses and a third portion 124c containing a single pulse. The width of each of the pulses in the first and third portions 126 and 130 is smaller than that of the pulse in the second portion 122 of the control signal.

The drive circuit 114 generates a pulsed power signal such as that indicated at 126 in FIG. 7. The pulsed power signal 126 is cyclical, also has the period P, and comprises positive and negative half-cycles 128 and 130, respectively. The negative half-cycle 130 is the identical to, but inverted from, the positive half-cycle 128. The timing of the positive and negative half-cycles 128 and 130 corresponds to the timing of each cycle of the drive signal 124.

The output circuit 116 integrates the pulsed power signal to obtain the AC power signal 118.

This circuit 110 employs drive signals such as those indicated at 132 and 134 in FIG. 7 as inputs to the drive circuit 114; these drive signals 132 and 134 comprise a series of pulses and allow any switching transistors employed in the drive circuit 114 to operate efficiently in either the "ON" or the "OFF" states. This is highly desirable for the reasons described in the Background of the Invention and will also be discussed in further detail below.

Additionally, as will also be described more fully below, the control signal generating circuit 112 is so designed that the widths of the pulses within the first and third portions 124a and 124b of the control signal 124 are altered to provide rising and falling portions 120a and 120b with a shape that substantially inhibits the above-discussed voltage spikes-being created within the taps 38.

Referring now back to FIG. 6, it can be seen that the exemplary control signal generating circuit 112 basically comprises a high frequency waveform generator 136, a low frequency waveform generator 138, a wave shaper 140, and a comparator 142. The high frequency waveform generator 136 generates a carrier signal having a sawtooth waveform such as the one depicted at 144 in FIG. 7. The low frequency waveform generator 138 generates a modulation signal also having a sawtooth waveform. The modulation signal is shaped by the wave shaper 140 to obtain a clipped sawtooth waveform such as that depicted at 146 in FIG. 7.

The just-mentioned comparator 142 has as its inputs the high frequency carrier signal 144 and the modulator signal 146; in response to these inputs, the comparator 142 generates the control signal 124 depicted in FIG. 7. The comparator 142 generates a "HIGH" voltage level when the modulator signal 146 is greater than the high frequency carrier signal 144 and a "LOW" voltage level when the modulator signal 146 is less than the carrier signal 144. The resulting control signal 124 is such that the widths of the pulses in the first portion 124a gradually increase over time and the widths of the pulses in the second portion 124b gradually decrease over time.

Referring again to FIG. 6, the output circuit 116 can be seen to comprise a linear transformer 150 and a low pass filter 152. The transformer 150 is designed to alter or, in this exemplary case, step up the voltage of a signal applied to its input.

The low pass filter 152 is designed to integrate the pulsed power signal 126 to obtain the standby AC power signal 120; more specifically, the low pass filter 152 smooths out the first and third portions 128a and 128b of the pulsed power signal 126 to obtain the rising and falling portions 120a and 120b depicted in FIG. 7.

By comparing the waveforms of the modulator signal 146 and the standby AC power signal 118, it can be seen that the standby AC power signal 118 has the same basic waveform as the modulator signal 146. In general, the circuit 110 maintains this relationship for waveforms other than the exemplary clipped sawtooth, or trapezoidal, wave described above; the shape of the waveform of the standby AC power signal 118 generated by the inverter circuit 110 is thus be controlled by the shape of the modulator signal 146.

Figure 9A:
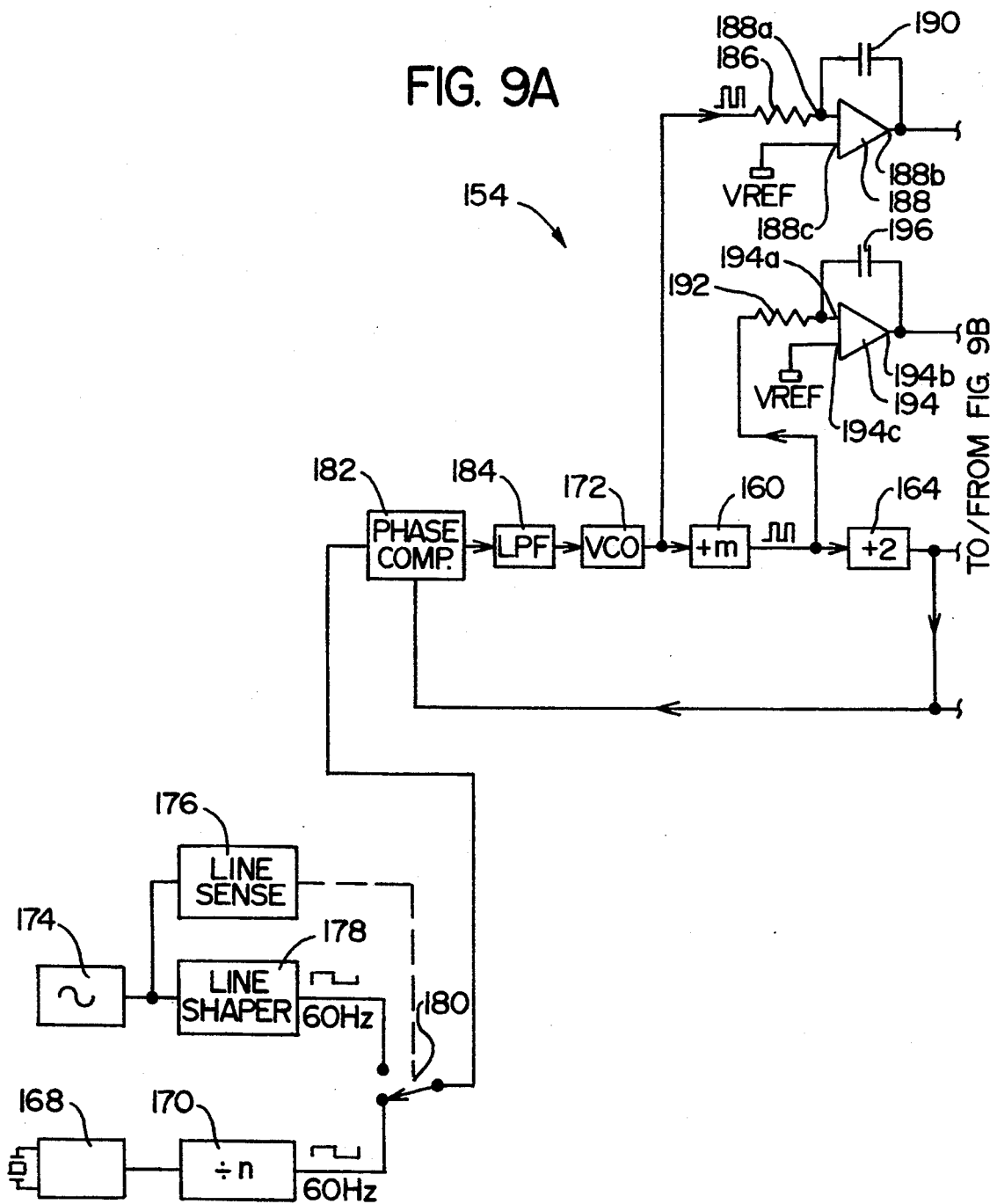
FIG. 9 is a simplified circuit diagram of the inverter module depicted in FIG. 8.
Figure 9B:
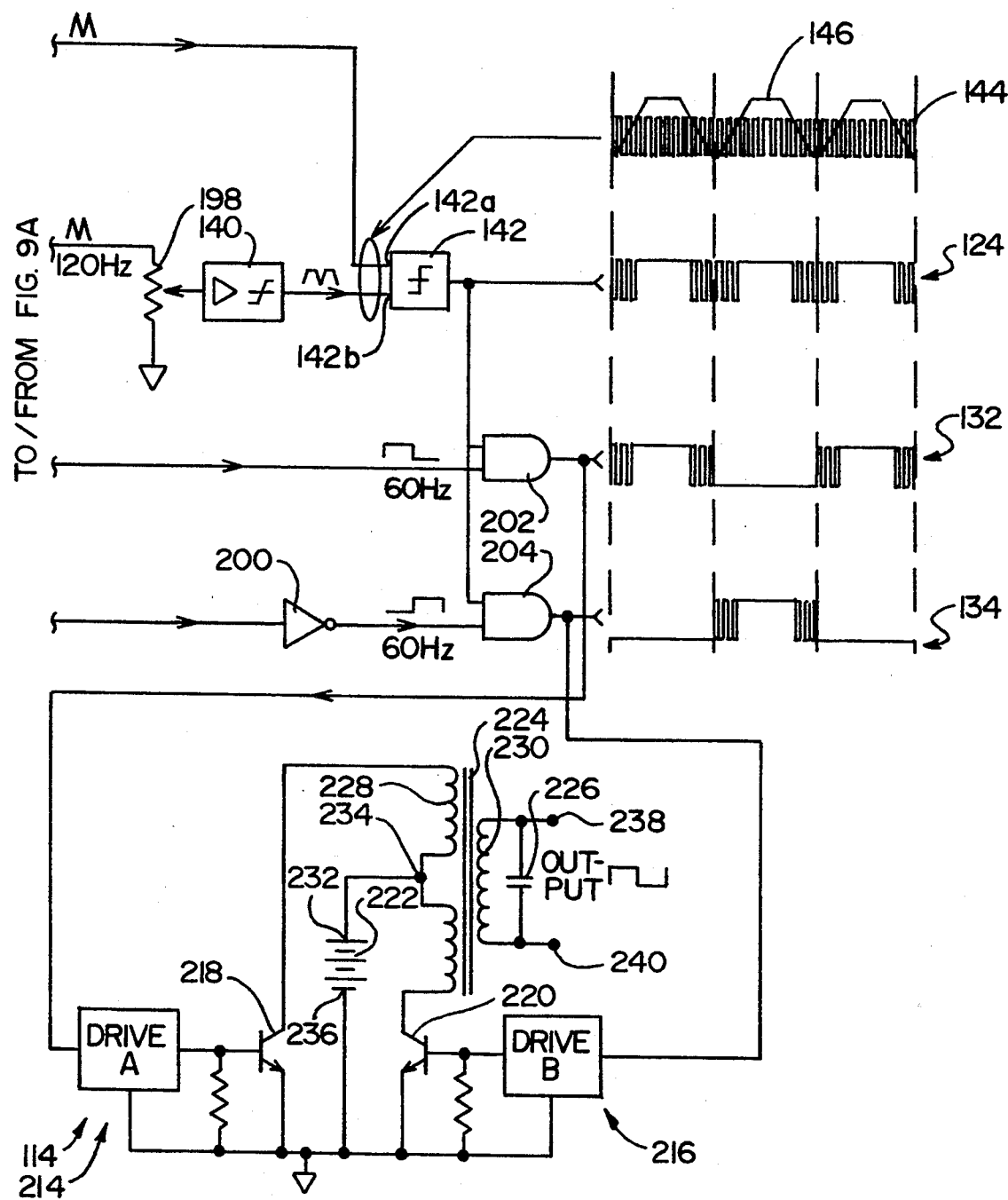

The inverter circuit 110 is depicted in further detail at 154 in FIGS. 8 and 9, FIG. 8 being a block diagram showing the overall arrangement of the components in the more detailed circuit diagram shown in FIG. 9.

Specifically, this circuit 154 shows that the low and high frequency waveform generators 136 and 138 preferably share a common frequency source 156 to maintain phase relationships between the carrier and modulator signals. This also allows efficient gating of the signal input to the drive circuit 114, as will be described further below.

The frequency source 156 generates a high frequency square wave. The high frequency waveform generator further comprises a high frequency integrator 158 that generates the sawtooth waveform carrier signal from the square wave generated by the high frequency source 156.

The low frequency waveform generator 138 additionally comprises a first divider circuit 160 and a low frequency integrator 162. The first divider circuit 160 divides the high frequency square wave generated by the frequency source 156 by an integer m, and the low frequency integrator 162 shapes the output of the divider circuit 160 to obtain a triangular waveform. The wave shaper 140 clips off the peaks of the triangular waveform generated by the low frequency wave shaper 162 to obtain the modulator signal 146 shown in FIG. 7.

The circuit 154 depicted in FIG. 8 also shows that the circuit 110 preferably additionally comprises a second divider circuit 164 that divides the output of the first divider circuit 160 by a factor of 2. The output of this second divider circuit 164 is used by a pulse gating circuit 166 to gate or select the output of the comparator 142 for purposes that will become clear from the following discussion.

Referring now to the more detailed FIG. 9, it can be seen that the high frequency source 156 preferably comprises the following basic elements: (a) an oscillator 168; (b) a third dividing circuit 170 for dividing the output of the oscillator 168 by an integer n; and (c) a voltage controlled oscillator 172. Optionally, the frequency source 156 also may comprise a phase lock loop comprising a connection 174 to the line voltage, a line sense element 176, a line shaper 178, a transfer relay 180, a phase comparator 182, and a low pass filter 184 for maintaining stability of the phase lock loop.

The basic effect of the oscillator 168, third divider circuit 170, and voltage controlled oscillator 172 is to obtain a stable high frequency square wave. Any combination of elements that perform this function may be inserted as replacements for these elements 168, 170, and 172.

The arrangement of the oscillator 168, third divider circuit 170, and voltage controlled oscillator 172, however, allow easy implementation of the optional phase lock loop. The optional phase lock loop ensures that, when the power supply switches from AC mode to inverter mode, the inverter or standby AC power signal generated by the inverter module 44 is in phase with the line AC power signal.

The phase lock loop operates in the following basic manner. As long as the line sense 176 indicates that no fault exists, the relay 180 is operated to allow the 60 Hz output of the line shaper 178 to pass through the phase comparator 182. The other input to this phase comparator is a 60 Hz signal generated downstream of the VCO 172 based on the output of the VCO 172. When the line sense 176 detects a fault, the relay 180 is operated to direct the 60 Hz output of the oscillator 168 into the phase comparator 182, thereby disconnecting the output of the line shaper 178 from the phase comparator 182. The phase comparator 182 compares the phase of the 60 Hz signal obtained downstream of the VCO 172 with the phase of the signal generated by the divider 170 and shifts the phase of the signal generated by the divider 170 to match that of the signal obtain downstream of the VCO 172. This ensures that the phase of the standby AC power signal matches that of the line AC power signal when the relay 50 switches therebetween.

The output of the VCO 172 is directed to the divider 160 and a first input resistor 186 of a first amplifier 188. Connected between an output terminal 188b of the first amplifier 188 and the first input terminal 188a is a feedback capacitor 190. A second input terminal 188c of the amplifier 188 is connected to a first reference voltage. The values of the resistor 186, capacitor 190, and first reference voltage are chosen to generate a sawtooth waveform having substantially the same period and phase as the high frequency square wave generated by the VCO 172. The first amplifier 188 and its associated components form the high frequency integrator 158.

The output of the divider element 160 is directed to the divider element 164 and a second input resistor 192 connected to a first input terminal 194a of a second amplifier 194. Connected between an output terminal 192b of the second amplifier 194 and the first input terminal 194a is a second feedback capacitor 196. A second input terminal 192c of the second amplifier 190 is connected to a second reference voltage. In a manner similar to that of the components associated with the first amplifier 188, the values of the second input resistor 192, second feedback capacitor 196, and second reference voltage are chosen to generate a sawtooth waveform having substantially the same period and phase as the low frequency square wave generated by the divider 160. The output terminal 194b of the second amplifier is connected to a variable resistor 198 to allow control of the slope of the sawtooth waveform generated at the output terminal 194b. The second amplifier 194 and its associated components form the low frequency integrator 162.

The variable resistor 198 is connected to the wave shaper 140 to clip the peaks off of, or limit the amplitude of, the sawtooth waveform generated at the output 194b of the second amplifier 194.

The output of the amplifier 188 is applied to a first input terminal 142a of the comparator 142, while the output of the wave shaper 140 is applied to a second input terminal 140b of the comparator 142.

The output of the above-mentioned divider element 164 is sent to an inverting element 200 and one input of a first AND gate 202. The output of the inverting element 200 is sent to one input of a second AND gate 204.

The output of the comparator 142 is applied to the other inputs of the AND gates 202 and 204. The inverting element 200 and the first and second AND gates 202 and 204 form the pulse gating circuit 166.

Referring again to FIG. 7, the timing of the various signals mentioned above will be described in further detail.

Initially, it should be noted that the output of the VCO 172 is 60*2*m Hz in a system designed for use in with a 60 Hz line signal. The integer "m" can be selected as appropriate for a given line frequency, but should be on the order of 10 to 50 KHz.

The output of the VCO 172 is applied directly to the first input resistor 186, so the frequency of the sawtooth high frequency carrier signal is also 60*2*m Hz.

The divider element 160 divides the output of the VCO 172 by m, yielding a signal having a frequency of 60*2 Hz, or 120 Hz. Accordingly, from the discussion above, it can be seen that the frequency of the low frequency modulator signal is the same as that of the output of the divider element 160, or 120 Hz.

The divider element 160 divides the output of the divider element 160 by 2, leaving a signal having a frequency of 60 Hz. This 60 Hz signal is not shaped, so the input to the AND gate 202 is a 60 Hz square wave, while the input to the AND gate 204 is a 60 Hz square wave 180° out of phase with that input to the AND gate 202.

As mentioned above, the comparator 142 generates a "HIGH" voltage level when the modulator signal 146 is greater than the high frequency carrier signal 144 and a "LOW" voltage level when the modulator signal 146 is less than the carrier signal 144. With the modulator signal 146 and carrier signal 144 as described above, the comparator output or control signal 124 (as shown in FIG. 7) comprises in each cycle the first portion 124a, the second portion 124b, and the third portion 124c. Further, the widths of the pulses in the first and third portions 124a and 124b are much smaller than the width of the pulse in the second portion 124c, with the width of the pulses in the first portion 124a gradually increasing over time and the width of the pulses in the second portion 124b gradually decreasing over time. In the present example, these first, second, and third portions 124a, 124b, and 124c of the 124 are repeated at a frequency of 120 Hz.

The comparator output signal 148 is ANDed with the above described 60 Hz square waves by the AND gates 202 and 204 to obtain the first and second drive signals indicated at 132 and 134 in FIG. 7. Specifically, the AND gate 202 selects every other cycle of the control signal 124 to generate the first drive signal 118, while the AND gate 204 selects the cycles of the control signal 124 not selected by the AND gate 202 to generate the second drive signal 212. The resulting signals 132 and 134 each have a period P and have one half-cycle containing pulses of first, second, and third portions 132a, 132b, 132c and 134a, 134b, 134c corresponding to the first, second, and third portions 124a, 124b, and 124c and another half-cycle 132d and 134d of zero volts ("LOW"). The AND gates 202 and 204 ensure that half-cycles 132d occur at the same time as the portions 134a, 134b, and 134c and the half-cycle 134d occurs at the same time as the portions 132a, 132b, and 132c.

These drive signals 132 and 134 are sent to the drive circuit 114, which, as shown in FIG. 9, comprises: first and second drive circuits 214 and 216, first and second switching transistors 218 and 220, a battery 222, a linear transformer 224, and an output capacitor 226. The transformer 224 has first and second windings 228 and 230. A positive terminal 232 of the battery 222 is connected to a center tap 234 of the first winding 228; a negative terminal 236 of the battery 222 is connected to ground.

The first and second switching transistors 218 and 220 are connected at their bases to the first and second drive circuits 214 and 216, respectively. The emitters of these transistors 214 and 216 are connected to ground, while the collectors thereof are connected to opposite ends of the first winding 228.

The ends of the second winding 230 are connected to output terminals 238 and 240, with the output capacitor 226 being connected across these terminals 238 and 240. The low pass filter 152 comprises the output capacitor 226.

The first and second drive signals 132 and 134 are applied to the first and second drive circuits 214 and 216. In response to these control signals, the first and second drive circuits provide an appropriate voltage to the bases of the switching transistors 218 and 220 to turn these transistors "ON" when the control signals are "HIGH". When either of the transistors 218 and 220 is "ON", current flows from positive terminal 232 of the battery 222, through the transformer center tap 234, out the appropriate end of the transformer first winding 228, through the "ON" transistor, and to ground (battery negative terminal 236).

It should be noted that the pulsed drive signals 132 and 134 are so switched between "HIGH" and "LOW" that the transistors 218 and 220 are always in their "ON" or "OFF" states; these transistors 218 and 220 thus spend very little time in the relatively inefficient linear range between "ON" and "OFF".

The output of the transformer 224 without the capacitor 226 connected across the outputs of the terminals 238 and 240 is the pulsed power signal depicted at 126 in FIG. 7. By integrating this pulsed signal 126 using the capacitor 226, the standby or inverter AC power signal depicted at 118 in FIG. 7 is obtained.

The shape of the signal 118 is important to practicing the principles of the present invention, and the rising and falling portions 120a and 120b of this half-cycle 120 are of particular interest.

In order to avoid the interference problem described above, the rising and falling portions 120a and 120b should remain within certain parameters. Specifically, these rising and falling portions 120a and 120b should not exit regions 252 and 254 inclusively defined by a sinusoidal curve segments 256a and 256b and/or first and second line segments 258 and 260 depicted in FIG. 10.

Figure 10:
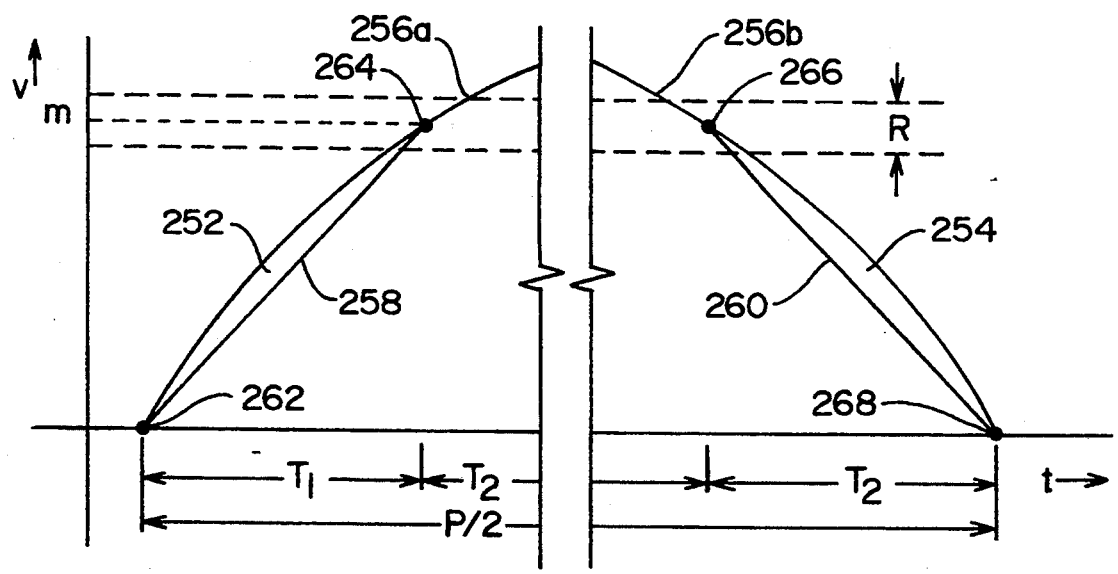
FIG. 10 depicts the regions within which the rising and falling portions of the AC power signal constructed in accordance with the present invention must fall to reduce saturation of the taps.

The sinusoidal curve segments 256a and 256b are portions of a sinusoidal curve having the same period P as, and which is in phase with, the inverter or standby AC power signal 120. In the exemplary AC power signal 118, these segments 256a and 256b are portions of the same sinusoidal curve, but this is not necessary to successfully implement the present invention. It is only required that the amplitude of this sinusoidal curve or curves is such that the curve or curves pass through first through fourth points 262, 264, 266, and 268 as shown in FIG. 10.

The first and fourth points 258 and 264 corresponds to the points at which the AC power signal 120 crosses over from negative to positive and from positive to negative, respectively. The second and third points 264 and 266 correspond to the beginning and end, respectively, of the relatively flat, third portion 120c of the power signal 120.

The first line segment 258 extends between the first and second points 262 and 264, while the second line segment 260 extends between the third and fourth points 266 and 268. In the preferred embodiment described above, to obtain the full benefits of the present invention, the slope of the line segment 258 should correspond to a slew rate range of 30 V/ms to 50 V/ms inclusive. Similarly, the slope of the exemplary line segment 260 should correspond to a slew rate range of $-30$ V/ms to $-50$ V/ms inclusive. The slope of these line segments 258 and 260 need not be the same; however, these segments 258 and 260 have the same slope in the exemplary AC power signal 118.

Referring now for a moment back to the second and third points 264 and 266 employed to locate the curve segments 256a, 256b and line segments 258 and 260, these points 264 need not have the same magnitude M but do so in the exemplary AC power signal 118.

Further, the points 264 and 266 may be identified by initially identifying the first and fourth points. For any given standby AC power signal, the second point 264 is the point at which the slope of the AC power signal curve leaves the range of rising slew rates defined above. Similarly, the third point 266 occurs at the point at which the slope of the AC power signal curve enters the range of falling slew rates defined above.

Another aspect of the preferred embodiment is that time durations $T_1$ and $T_2$ of the first and second portions 120a and 120b should be between 17% and 30% of a time duration P/2 of the positive half-cycle 128. This ensures that the standby AC power signal 120 contains a significant relatively flat central portion during each half-cycle for the purpose of efficiently delivering power to the line extenders 32, as discussed above. With the exemplary standby AC power signal 118, $T_1$ and $T_2$ are the same.

As briefly discussed above, the exact shape of the leading and trailing portions 120a and 120b is not important as long as the AC power signal 118 remains within the regions 252 and 254. However, the leading and trailing edges 120a and 120b of the exemplary half-cycle 120 of the AC power signal 118 depicted above follow the line segments 258 and 260. The circuit 110 thus yields a standby AC power signal 120 that is essentially trapezoidal.

Alternatively, by designing the low frequency waveform generator 138 and the wave shaper 140 so that the modulator signal 146 is a sine wave, a sinusoidal standby AC power signal may be obtained such that the rising and falling portions of each half-cycle thereof follow the sinusoidal curve 256. The waveform depicted at 270 in FIG. 11 contains essentially sinusoidal rising and falling portions 270a and 270b.

Figure 11:
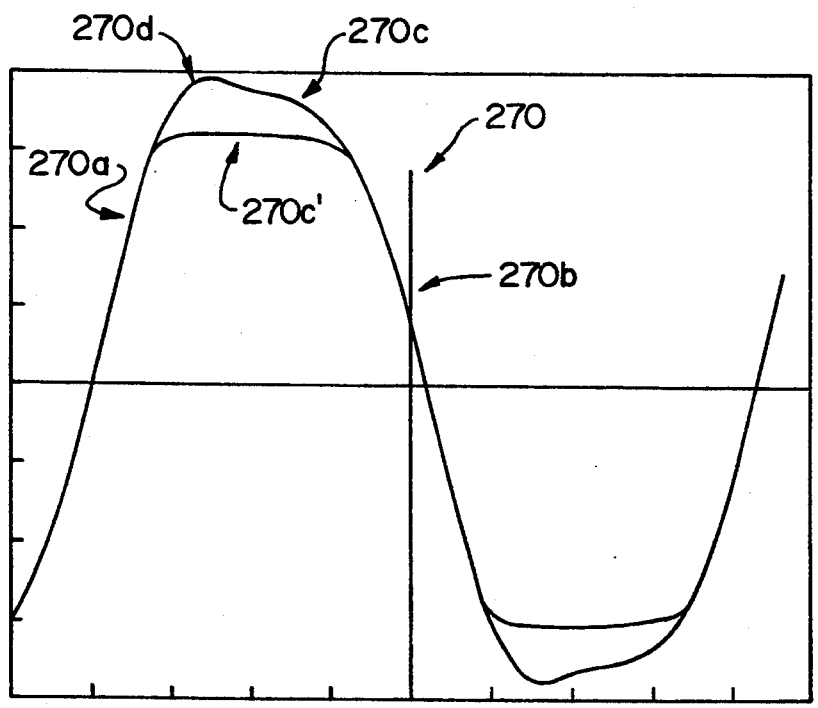
FIG. 11 depicts an alternative AC power signal produced in accordance with the principles of the present invention.

It should be noted that an AC power signal having sinusoidal rising and falling portions such as those shown at 270a and 270b in FIG. 11 or linear rising and falling portions such as those shown at 120a and 120b in FIG. 7 are the most desirable for the purposes of the present invention because they may be relatively easily and inexpensively implemented.

It should also be noted that the third portion 120a of the AC power signal half-cycle 120, which has been described above as relatively flat, need not be absolutely flat between the second point 264 and the third point 266; however, at no point between these points 264 and 266 should the slope of the AC power signal 118 exceed 50 V/ms or go below −50 V/ms. Additionally, between these points 264 and 266, the exemplary AC power signal 118 should remain within a range R of 75 ±5 volts, inclusive, centered around the magnitude M (75 volts in the exemplary embodiment) of the points 264 and 266.

In the waveform 270 depicted in FIG. 11, it can be seen that a central potion 270c thereof comprises a slight peak indicated at 270d when the power supply is unloaded. A central portion 270c' of the waveform 270 when the power supply is loaded, however, does not contain a peak such as that depicted at 270d. Such variations in the shape of the central portion of a standby or inverter AC power signal are well within the variations that may actually occur when successfully implementing the principles of the present invention.

A standby or inverter AC power signal generated within the parameters described above should substantially eliminate the interference problem caused by saturation of the coupling transformers in the taps.

The invention disclosed and claimed herein may be embodied in specific forms other than that described above without departing from the spirit or essential characteristics thereof. The present embodiment is therefore to be considered in all respects as illustrative and not restrictive. The scope of the invention is indicated by the appended claims rather than the foregoing description. All changes which come within the meaning and range of equivalency of the claims are intended to be embraced therein.

I claim:

1. In a cable TV distribution system comprising a distribution cable for carrying a cable TV signal, a plurality of line-extending amplifiers connected at intervals along the distribution cable for amplifying the cable TV signal, and at least one tap means connected to the distribution cable for coupling a drop cable to the distribution cable, a method of supplying power to the line-extending amplifiers comprising the steps of:
   a. generating an AC power signal having at least a positive half-cycle, where the positive half-cycle comprises a rising portion, a falling portion, and a central portion whose amplitude is maintained within a range centered about a predetermined value; and
   b. so limiting the AC power signal within the rising portion that the AC power signal remains within a range inclusively defined by:
      i. a first line segment extending between a first point at the beginning of the rising portion and a second point at the end of the rising portion, and
      ii. a first curve segment of a first sinusoidal curve having the same period as the AC power signal, the first curve segment extending between the first and second points; wherein
   c. the AC power signal is so generated that it further has a negative half-cycle, the negative half-cycle being related to the positive half-cycle in an inverted, mirror image manner.

2. A method as recited in claim 1, further comprising the step of so limiting the AC power signal within the falling portion that the AC power signal remains within a range inclusively defined by:
   a. a second line segment extending between a third point at the beginning of the falling portion and a fourth point at the end of the falling portion, and
   b. a second curve segment of a second sinusoidal curve having the same period as the AC power signal, the second curve segment extending between the third and fourth points.

3. A method as recited in claim 2, in which the first and second sinusoidal curves are substantially the same.

4. A method as recited in claim 1, in which a duration of the rising and falling portions is 17% to 30% of the duration of the positive half-cycle.

5. A method as recited in claim 4, in which the duration of the rising and falling portions are substantially the same.

6. A method as recited in claim 2, in which the slope of the first line segment is within the range of 30 V/ms to 50 V/ms, inclusive.

7. A method as recited in claim 6, in which the slope of the second line segment is within the range of −30 V/ms to −50 V/ms, inclusive.

8. A method as recited in claim 2, in which the voltage of the AC power signal within the range of 75 ±5 volts.

9. A power supply for generating an AC power signal that is supplied to line extending amplifiers in a cable TV distribution system, comprising:
   a. means for generating first and second drive signals each having a first portion comprising a series of pulses, a second portion comprising a series of pulses, and a third portion comprising a single pulse;
   b. a transformer having first and second windings, where a center tap is formed in the first transformer winding;
   c. a DC power source connected between the center tap and ground;
   d. a first switching transistor connected between one end of the first transformer winding and ground, where the first drive signal is applied to the first switching transistor to allow or prevent current flow from the DC power source through the transformer;
   e. a second switching transistor connected between another end of the first transformer winding and ground, where the second drive signal is applied to the second switching transistor to allow or prevent current flow from the DC power source through the transformer; and
   f. means for integrating the voltage across the transformer to obtain the AC power signal, where a first half-cycle of the AC power signal is generated by the first switching transistor and a second half-cycle of the AC power signal is generated by the second switching transistor.

10. A power supply as recited in claim 9, in which the width of the pulses in the first and second portions of the first and second drive signals is smaller than the width of the single pulse in the third portion thereof.

11. A power supply as recited in claim 10, in which the third portion is between the first and second portions.

12. A power supply as recited in claim 11, in which the widths of the pulses in the first portion gradually increase over time and the widths of the pulses in the second portion gradually decrease over time.

13. A power supply as recited in claim 12, in which
   a. the first drive signal is applied to the first transistor to allow or prevent current flow through a first end of the transformer primary winding; and b. the second drive signal is applied to the second transistor to allow or prevent current flow through a second end of the transformer primary winding.

14. A power supply as recited in claim 9, in which period of the AC power signal is P, where the drive signal generating means comprises:
   a. means for generating a control signal having a period of P/2, each cycle of the control signal having a first portion comprising a series of pulses, a second portion comprising a series of pulses, and a third portion comprising a single pulse; and
   b. means for selecting alternate cycles of the control signal to generate the first and second drive signals.

15. A power supply as recited in claim 14, in which the control signal generating means comprises:
   a. means for generating a carrier signal;
   b. means for generating a modulator signal, the frequency of the modulator signal being low relative to the frequency of the carrier signal; and
   c. comparing means for generating the control signal by comparing the amplitude of the carrier signal with that of the modulator signal.

16. A power supply as recited in claim 15, further comprising means for generating a clock signal from which the carrier and modulator signals are derived and based on which the selecting means generates the first and second drive signals.

* * * * *